(12) United States Patent
Bao et al.

(10) Patent No.: US 12,737,870 B2
(45) Date of Patent: Sep. 15, 2026

(54) METHOD AND SYSTEM FOR DETECTING STRUCTURAL PERFORMANCE OF FIRE RETARDANT DISC

(71) Applicants: CHINA PETROLEUM & CHEMICAL CORPORATION, Beijing (CN); SINOPEC RESEARCH INSTITUTE OF SAFETY ENGINEERING CO., LTD, Qingdao (CN)

(72) Inventors: Lei Bao, Qingdao (CN); Peng Wang, Qingdao (CN); Anfeng Yu, Qingdao (CN); Lili Ding, Qingdao (CN); Wenyi Dang, Qingdao (CN); Guoxin Chen, Qingdao (CN); Meng Gu, Qingdao (CN); Haozhe Wang, Qingdao (CN); Xiaodong Ling, Qingdao (CN)

(73) Assignees: CHINA PETROLEUM & CHEMICAL CORPORATION, Beijing (CN); SINOPEC RESEARCH INSTITUTE OF SAFETY ENGINEERING CO., LTD., Qingdao (CN)

( * ) Notice: Subject to any disclaimer, the term of this patent is extended or adjusted under 35 U.S.C. 154(b) by 363 days.

(21) Appl. No.: 18/575,812

(22) PCT Filed: May 16, 2022

(86) PCT No.: PCT/CN2022/092971
§ 371 (c)(1),
(2) Date: Dec. 29, 2023

(87) PCT Pub. No.: WO2023/273646
PCT Pub. Date: Jan. 5, 2023

(65) Prior Publication Data

US 2024/0370987 A1 Nov. 7, 2024

(30) Foreign Application Priority Data

Jul. 2, 2021 (CN) ........................ 202110751964.X

(51) Int. Cl.
*G06T 7/00* (2017.01)
*G06T 3/4038* (2024.01)
(Continued)

(52) U.S. Cl.
CPC .......... *G06T 7/0004* (2013.01); *G06T 3/4038* (2013.01); *G06T 7/60* (2013.01); *G06V 10/422* (2022.01); *G06T 2200/32* (2013.01)

(58) Field of Classification Search
CPC ....... G06T 7/0004; G06T 3/4038; G06T 7/60; G06T 2200/32; G06V 10/422
(Continued)

(56) References Cited

FOREIGN PATENT DOCUMENTS

| | | | |
|---|---|---|---|
| CN | 107993235 | A | 5/2018 |
| CN | 110455200 | A | 11/2019 |

(Continued)

OTHER PUBLICATIONS

Liu, Lei; "Development of a Visual Measuring Instrument for the Height Parameter of Fire-Resisting Plate"; Engineering Science and Technology I, No. 05, May 15, 2022; ISSN:1674-0246; pp. 1-98.

(Continued)

*Primary Examiner* — Jonathan S Lee
(74) *Attorney, Agent, or Firm* — NKL Law; Allen Xue

(57) ABSTRACT

A method and system for detecting structural performance of fire retardant disc includes the steps of obtaining passage structural information characterizing a structural feature of each passage in a fire retardant disc to be detected, analyzing said passage structural information and measuring a key feature size of each passage, statistically analyzing feature size distribution of each passage according to said key feature size, and determining a structural uniformity state of said fire retardant disc to be detected based on statistical (Continued)

S110
Obtaining passage structural information characterizing a structural feature of each passage in a fire retardant disc to be detected S120
Analyzing said passage structural information and measuring a key feature size of each passage S130
Statistically analyzing feature size distribution of each passage according to key feature size, determining fire retardant quality of fire retardant disc to be detected based on statistical result, and obtaining detection result result. The method is able to overcome the disadvantage of manual detection in the structural performance of the fire retardant disc, and effectively detect and assess the structural performance of the fire retardant disc in different use conditions.

13 Claims, 2 Drawing Sheets

(51) Int. Cl.
*G06T 7/60* (2017.01)
*G06V 10/422* (2022.01)

(58) Field of Classification Search
USPC .......................................................... 382/141
See application file for complete search history.

(56) References Cited

FOREIGN PATENT DOCUMENTS

CN 110470230 A * 11/2019 ........... G06T 3/4038
JP 2002310618 A 10/2002

OTHER PUBLICATIONS

Liu, Lei et al.; "A machine vision-based method for measuring surface wave heights of corrugated fire retardant disk"; China Measurement & Test; vol. 46, No. 06, Jun. 30, 2020; ISSN:1674-5124; pp. 44-50.

* cited by examiner

METHOD AND SYSTEM FOR DETECTING STRUCTURAL PERFORMANCE OF FIRE RETARDANT DISC

TECHNICAL FIELD

The present invention relates to the technical field of fire retardance safety, and specifically to method and system for detecting structural performance of fire retardant disc.

TECHNICAL BACKGROUND

Fire arrestors, as the last protective means to prevent the spread of accidental flames, have been used widely in recent years in petrochemical plant pipelines and other industrial equipment where flammable substances (e.g. flammable gases) are present. In fire conditions, a fire arrestor with reliable performances can effectively retard the fire, thus avoiding greater damage. As a key component of fire arrestor, the fire retardant disc plays an important role in preventing deflagration and detonation flames. In the prior arts, most of the fire retardant discs have countless micro passages each shaped like a triangle and formed by winding flat belts and corrugated belts. The fire arrestor functions based on these micro passages of the fire retardant disc.

At present, the structural performance of the fire retardant disc when being manufactured is generally detected through manual testing methods, which mainly include naked-eye observation, relying on experience to judge the quality of the fire retardant disc. Due to lack of scientific and quantitative data, the manual observation method to assess the fire retardant performance of the fire retardant disc cannot produce objective and effective detecting results. In addition, there are also methods that adopt calipers to measure relevant data of the corrugated belts in the fire retardant disc at regular intervals, so as to obtain quantitative data. Not only is the implementation thereof cumbersome, but also minor changes in the relevant data of the corrugated belts in the fire retardant disc will be easily ignored during the measurement. Therefore, these methods also fail to produce effective test results.

Hence, the present invention aims to propose a method for effectively detecting structural performance of fire retardant disc, in order to better detect the structural performance of fire retardant disc in different conditions of use.

SUMMARY OF THE INVENTION

Aiming at the above technical problems, the embodiments of the present invention propose a method for detecting structural performance of fire retardant disc, which comprises obtaining passage structural information characterizing structural features of each passage in the fire retardant disc to be detected, analyzing said passage structural information and measuring key feature of each passage, statistically analyzing characteristic size distribution of each passage according to said key feature size, and determining structural uniformity state of said fire retardant disc to be detected based on statistical results.

Preferably, the passage structural information is obtained through one of multi-point random sampling technology, overall linear scanning technology, overall image shooting technology, and partial image shooting and stitching technology.

Preferably, the step of obtaining passage structural information characterizing a structural feature of each passage in a fire retardant disc to be detected comprises estimating a total number of passages in the fire retardant disc to be detected, determining a number of detecting points to be selected, dividing the fire retardant disc into a plurality of portions based on the number of detecting points and distribution of each passage, randomly selecting a detecting point in each portion to obtain a first set of passage samples comprising each detecting point, and obtaining the passage structural information according to a structural feature of each detecting point in the first set of passage samples.

Preferably, the step of analyzing said passage structural information and measuring a key feature size of each passage comprises constructing a passage structure model for reproducing a passage structure based on pixel pitch in the passage structure information in combination with a geometric feature of the passage structure, and identifying the key feature size of each passage in said passage structure model.

Preferably, when the passage structure of the fire retardant disc to be detected is triangular, a triangular passage structure model is constructed, and a height of a triangular passage is determined as the key feature size of each passage;

when the passage structure of the fire retardant disc to be detected is trapezoidal, a trapezoidal passage structure model is constructed, and a height of a trapezoidal passage is determined as the key feature size of each passage; and when the passage structure of the fire retardant disc to be detected is rhombic, a rhombic passage structure model is constructed, and a short diagonal line of a rhombic passage is determined as the key feature size of each passage.

Preferably, the method further comprises correcting actually-measured size data of each passage in the passage structure information through standard size information, in order to obtain a correction result characterizing a correspondence between the actually-measured size data and a measured value, thereby correcting the measured value in the passage structure model through the correction result.

Preferably, a step of generating intervals of a threshold range comprises calculating an upper limit value or a design threshold of a feature size corresponding to the passage structure based on a fire retardant grade corresponding to the fire retardant disc to be detected, and based on which, determining a plurality of intervals of a threshold range for classifying and counting the key feature size data of each passage.

Preferably, the step of determining a structural uniformity state of said fire retardant disc to be detected comprises determining effectiveness of fire retardant performance of the fire retardant disc to be detected based on the key feature size data for each passage of the fire retardant disc to be detected and the upper limit value or the design threshold of the feature size corresponding to the passage structure, and statistically analyzing distribution of the key feature size of the fire retardant disc according to the key feature size data of each passage and the plurality of intervals of the threshold range, and then analyzing the structural performance of the fire retardant disc according to statistical result, when the fire retardant performance of the fire retardant disc to be detected is effective.

Preferably, the key feature size data of each passage in the fire retardant disc to be detected is compared with said upper limit value or the design threshold of the feature size, respectively, and if the key feature size data of each passage is smaller than said upper limit value or the design threshold of the feature size, it is determined that a structural state of the fire retardant disc reaches an effective fire retardant level; otherwise, the structural state of the fire retardant disc is in an ineffective fire retardant level.

Preferably, an interval of the threshold range belonging to a first type of structural error range is determined, and a structural error of the fire retardant disc to be detected is calculated according to the statistical result of the feature size distribution of each passage. The structural uniformity state of the fire retardant disc to be detected is determined based on the structural error through a predetermined acceptable error threshold.

Preferably, an objective correlation function is constructed, with the effectiveness of fire retardant performance of the fire retardant disc to be detected as an objective, and a cumulative use time of the fire retardant disc and the structural error corresponding to the statistical result of the feature size distribution of the fire retardant disc as influencing factors. A remaining life span of the fire retardant disc is predicted based on an acceptable error threshold of effectiveness reaching limit fire retardant performance through said objective correlation function.

Preferably, the fire retardant disc to be detected is an in-service fire retardant disc or a new fire retardant disc, wherein when the fire retardant disc is the in-service fire retardant disc, said method further comprises cleaning the fire retardant disc so as to remove impurities on a surface thereof that may affect measurement.

Preferably, the method further comprises determining fire retardant quality of the fire retardant disc according to the structural uniformity state thereof.

In another aspect, the present invention further discloses a system for detecting structural performance of fire retardant disc, comprising:

- a data measurement module, configured to obtain passage structural information characterizing a structural feature of each passage in the fire retardant disc to be detected;
- a data measurement and calculation module, configured to analyze the passage structural information, and measure a key feature size data of each passage; and
- a data statistical analysis module, configured to statistically analyze feature size distribution of each passage based on the key feature size data, and determine a structural uniformity state of the fire retardant disc to be detected based on statistical results.

In addition, the present invention further discloses a computer device, comprising a processor and a memory, said memory having stored therein at least one instruction, at least one segment of program, a code set, or a set of instructions, the at least one instruction, the at least one segment of program, the code set, or the set of instructions being loaded and executed by said processor to implement said method.

In addition, the present invention further discloses a computer readable storage medium, characterized in that the readable storage medium has stored therein at least one instruction, at least one segment of program, a code set, or a set of instructions, the at least one instruction, the at least one segment of program, the code set, or the set of instructions being loaded and executed by said processor to implement said method.

Compared with the prior arts, one or more of the embodiments in the above technical solutions have the following advantages or advantageous effects.

The present invention proposes a method for detecting structural performance of fire retardant disc, which can automatically obtain passage structure information of the fire retardant disc in different use conditions based on machine vision technology, and determine the distribution of the key feature size of each passage of the fire retardant disc by constructing the corresponding equivalent mathematical model, so as to detect the structural performance of the fire retardant disc accordingly. This method plays an important role in quality control during the production of fire retardant disc, performance assessment of fire retardant disc before installation thereof, and performance assessment of used fire retardant disc.

Other features and advantages of the present invention will be set forth in the description which follows, and, in part, will be apparent from the description, or may be learned from the implementation of the present invention. The objective and other advantages of the present invention may be realized and attained from the structure particularly pointed out in the description, claims and drawings.

BRIEF DESCRIPTION OF THE DRAWINGS

The accompanying drawings are used to provide a further understanding on the present invention, and constitute a part of the description. Together with the embodiments of the present invention, the drawings are intended to explain the present invention, but do not constitute any limitation to the present invention. In the drawings.

DETAILED DESCRIPTION OF EMBODIMENTS

Figure 1:
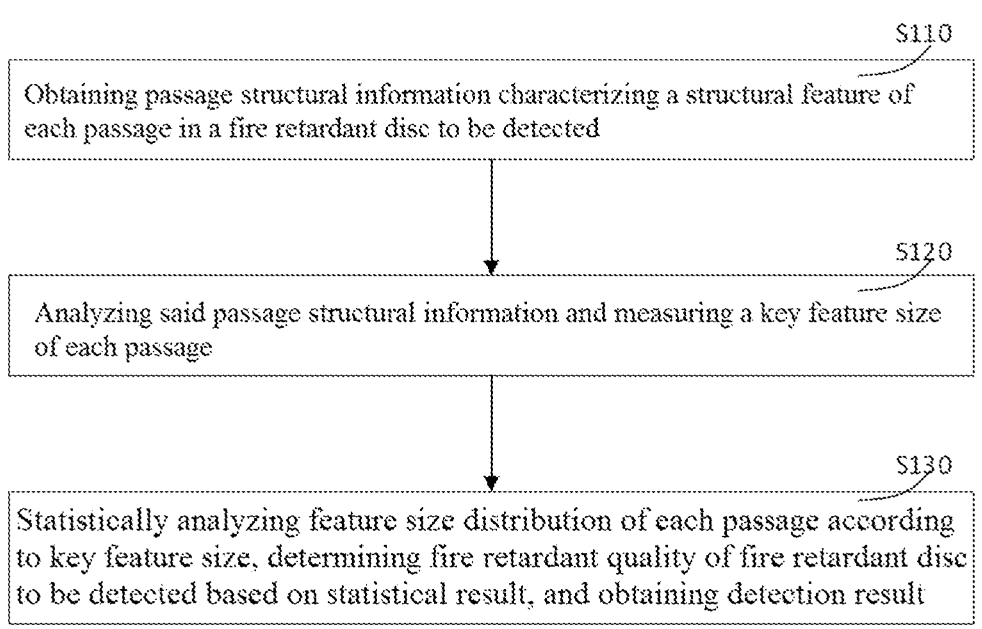
FIG. 1 shows steps in a first example of a method for detecting structural performance of fire retardant disc according to embodiments of the present application.

The implementation mode of the present invention will be explained in detail with reference to the embodiments and the accompanying drawings, whereby it can be fully understood how to solve the technical problem by the technical means according to the present invention, implement the technical solution, and achieve the technical effects thereof. It should be noted that all the embodiments and the technical features defined therein may be combined together if there is no conflict, and the technical solutions obtained in this manner shall all fall within the scope of protection of the present invention.

In addition, the steps illustrated in the flowchart in the drawings can be performed in a computer system containing a set of computer-executable instructions. Moreover, although a logical sequence is shown in the flowchart, in some cases these steps as shown or described may be performed in an order different than that shown herein.

Fire arrestors, as the last protective means to prevent the spread of accidental flames, have been used widely in recent years in petrochemical plant pipelines and other industrial equipment where flammable substances (e.g. flammable gases) are present. In fire conditions, a fire arrestor with reliable performances can effectively retard the fire, thus avoiding greater damage. As a key component of fire arrestor, the fire retardant disc plays an important role in preventing deflagration and detonation flames. In the prior arts, most of the fire retardant discs have countless micro passages each shaped like a triangle and formed by winding flat belts and corrugated belts. The fire arrestor functions based on these micro passages of the fire retardant disc.

At present, the structural performance of the fire retardant disc when being manufactured is generally detected through manual testing methods, which mainly include naked-eye observation, relying on experience to judge the quality of the fire retardant disc. Due to lack of scientific and quantitative data, the manual observation method to assess the fire retardant performance of the fire retardant disc cannot produce objective and effective detecting results. In addition, there are also methods that adopt calipers to measure relevant data of the corrugated belts in the fire retardant disc at regular intervals, so as to obtain quantitative data. Not only is the implementation thereof cumbersome, but also minor changes in the relevant data of the corrugated belts in the fire retardant disc will be easily ignored during the measurement. Therefore, these methods also fail to produce effective test results.

Aiming at the above technical problems, the embodiments of the present invention, therefore, propose a method and system for detecting structural performance of fire retardant disc, wherein machine vision technology is adopted to automatically obtain the passage structural information of the fire retardant disc in different use conditions, and a corresponding equivalent mathematical model is constructed to determine the distribution of key feature size of each passage in the fire retardant disc, thereby effectively detecting and evaluating the structural performance of the fire retardant disc in different use conditions.

Example 1

FIG. 1 shows steps in Example 1 of a method for detecting structural performance of fire retardant disc according to embodiments of the present application. The specific steps of this method are described below with reference to FIG. 1.

As shown in FIG. 1, in step S110 passage structural information characterizing structural feature of each passage in the fire retardant disc to be detected is obtained. In the embodiments of the present application, the passage structural information characterizing the structural feature of each passage in the fire retardant disc to be detected is obtained through image processing technology.

Further, one of the image processing technologies including multi-point random sampling technology, overall linear scanning technology, overall image shooting technology, and partial image shooting and stitching technology is selected to obtain the passage structural information of the fire retardant disc to be detected. Specifically, based on one of the above four image processing technologies, a corresponding image acquisition device (e.g., electron micro camera, high-definition camera, laser linear camera) is utilized to acquire image data containing feature information on passage structure of the fire retardant disc to be detected. The image data should accurately reflect the distribution of passage structure of the fire retardant disc to be detected, i.e., the passage structure of the fire retardant disc to be detected can be reproduced based on said image data. Accordingly, the image data of the fire retardant disc to be detected should include at least pixel pitch data and geometric feature data of the passage structure. In the embodiments of the present application, one of the above four image processing technologies is adopted to automatically obtain the passage structural information characterizing structural feature of each passage in the fire retardant disc to be detected based on machine vision technology, thereby effectively avoiding errors generated by manual measurement and those generated in the following data processing. In this manner, highly efficient and accurate acquisition of the passage structural information of the fire retardant disc to be detected can be realized.

For convenience, in the embodiments of the present application, the fire retardant disc to be detected is divided into two types, namely new fire retardant disc and in-service fire retardant disc, according to the state of use. The unused fire retardant disc after production is categorized as new fire retardant disc, and the used fire retardant disc is categorized as in-service fire retardant disc. In actual applications, for the fire retardant disc to be detected with dirty surface, the surface thereof should be cleaned before obtaining the structural information of each passage, so as to remove impurities on the surface that may affect the measurement, thereby ensuring that the passage structural information characterizing the structural feature of each passage in the fire retardant disc to be detected can be accurately obtained.

In one embodiment of the present application, the passage structural information characterizing the structural feature of each passage in the fire retardant disc to be detected is preferably obtained by random sampling. The fire retardant discs with different design parameters (e.g., diameter, design value of feature size of passage, and fire retardant grade) will have different numbers of passages. Therefore, it is necessary to estimate a total number of passages of the fire retardant disc to be detected before random sampling, based on which a number of detecting points to be selected is determined. The method of estimating the total number of passages in the fire retardant disc is shown in Table 1:

TABLE 1

Total estimated number of passages in fire retardant disc

| Design threshold of feature size of passage | Total number of passages |
|---|---|
| H ≥ 0.7 mm | $0.6(D/H)^2$ |
| 0.45 ≤ H < 0.7 | $0.5(D/H)^2$ |
| H < 0.45 | $0.4(D/H)^2$ |

wherein H denotes the design threshold of feature size of passage in the fire retardant disc, and D denotes the diameter of the fire retardant disc.

As shown in FIG. 1, the total number of passages in the fire retardant disc to be detected is calculated based on the design threshold of feature size of passage in the fire retardant disc to be detected. In the embodiments of the present application, after determining locations of all the passages in the fire retardant disc to be detected, the fire retardant disc is divided evenly into a plurality of portions based on the current number of detecting points to be selected and the distribution of the passage structure. Next, a detecting point is randomly selected in each portion to obtain a preferred first set of passage samples comprising each detecting point. The structural feature of each passage in the fire retardant disc to be detected is characterized by the structural feature of each detecting point in the first set of passage samples, and the corresponding passage structural information is obtained. Alternatively, the fire retardant disc may also be divided evenly into a plurality of portions according to the distribution of the passage structure based on the locations of all the passages of the fire retardant disc to be detected. Next, a detecting point is randomly selected in each portion at two side faces of the passage structure to obtain a preferred second set of passage samples. The structural feature of each passage in the fire retardant disc to be detected is characterized by the structural feature of each detecting point in the second set of passage samples, and the corresponding passage structural information is obtained. In order to ensure that the randomly selected sample is representative, the number of samples in the preferred set of passage samples should be no less than one ten-thousandth of, and no more than one thousandth of the total number of passages in the fire retardant disc to be detected. It should be noted that in the present invention how to determine the preferred set of passage samples and the number of corresponding subset thereof are not limited, which can be selected by one skilled in the art according to actual needs.

Further, in step S120, said passage structural information is analyzed and key feature size data of each passage is measured. Specifically, in step S120, the passage structural information should be analyzed first to construct a passage structure model of the fire retardant disc to be detected. Specifically, in step S120 the passage structural information of the fire retardant disc to be detected obtained in step S110 is first analyzed, and a machine-recognizable passage structure model of the fire retardant disc to be detected (e.g., a geometric model) is constructed based on the analysis results, in order to identify the key feature size of each passage through the passage structure model.

Specifically, a passage structure model for reproducing the passage structure is constructed based on the pixel pitch in the passage structure information in combination with the geometric feature of the passage structure. First, pixel pitch data of each passage is extracted from the passage structural information of the fire retardant disc to be detected obtained in step S110, and a measured value of feature size for each passage in the fire retardant disc to be detected is determined based on the pixel pitch data. Then, a geometric shape of the passage structure of the fire retardant disc to be detected is determined based on a known polygon closest thereto. Next, based on the measured value of feature size of each passage in the fire retardant disc to be detected, and in combination with the geometric shape of the passage structure of the fire retardant disc to be detected, the passage structure of the fire retardant disc to be detected is constructed, and the measured value of the feature size of each passage is indicated in the passage structure model.

In this manner, in step S120 not only the measured size corresponding to the structural feature of each passage in the fire retardant disc to be detected is obtained, but also the passage structure model is constructed at the same time. The measured value of feature size of the passage in the fire retardant disc to be detected is obtained based on the pixel pitch data of each passage. By calculating the actual distance of the passage of the fire retardant disc corresponding to the pixel pitch in the passage structure image of the fire retardant disc to be detected in step S110, the structural size data of each passage of the fire retardant disc in the captured image is then calculated, which is recorded as the measured value of feature size of the corresponding passage.

Further, after completing the construction of the passage structure model, in step S120 the key feature size of each passage in the constructed passage structure model is identified. In the embodiments of the present application, the key feature size of each passage in the fire retardant disc to be detected is measured based on the passage structure model of the fire retardant disc to be detected obtained in step S120. The passage structure model of the fire retardant disc to be detected obtained in step S120 is constructed based on a known polygon closest to the passage structure of the fire retardant disc to be detected, whereby each passage structure in the passage structure model can be analyzed in accordance with the geometrical properties of the corresponding known polygon. Meanwhile, when the passage structure model of the fire retardant disc to be detected is constructed, a large number of the feature size data of the passages are generally adopted for constructing the passage structure model of the fire retardant disc to be detected, so that the passage structure model constructed can accurately reflect the passage structure information of the fire retardant disc to be detected. Therefore, the number of feature size of the passage structure involved in the detection should be simplified accordingly when the passage structure model is used to assess the structural performance of the fire retardant disc to be detected. As a result, in the embodiments of the present application, the key feature size of the passage is utilized to analyze the fire retardant disc to be detected, so as to reduce the complexity of the detection. Specifically, the key feature size data are determined in accordance with the geometric properties of a known polygon corresponding to the passage structure of the fire retardant disc to be detected, wherein the key feature size data are used as the main representative index of the size feature of the corresponding passage.

The method of measuring the key feature size of each passage in the fire retardant disc to be detected is exemplified as follows. When the passage structure of the fire retardant disc to be detected is approximately triangular, a triangular passage structure model is constructed, wherein the height of the triangular passage along a radial direction of the fire retardant disc is determined as the key feature size of the passage. When the passage structure of the fire retardant disc to be detected is approximately trapezoidal, a trapezoidal passage structure model is constructed, wherein the height of the trapezoidal passage is determined as the key feature size of the passage. When the passage structure of the fire retardant disc to be detected is approximately rhombic, a rhombic passage structure model is constructed, wherein the short diagonal line of the rhombic passage is determined as the key feature size of the passage.

Further, in step S130, the feature size distribution of each passage is statistically analyzed based on the key feature size data of each passage obtained in step S120, and the structural uniformity state of the fire retardant disc to be detected is determined based on the statistical results of the feature size distribution of each passage. Specifically, according to the upper limit value or design threshold of the feature size corresponding to the passage structure of the fire retardant disc to be detected, a threshold range comprising a plurality of intervals is determined, based on which the key feature size distribution of each passage is statistically analyzed. Within each interval of the threshold range, the distribution of the key feature size data obtained in step S120 is statistically analyzed. Finally, the current statistical analysis result is used to determine the structural uniformity state of the fire retardant disc to be detected.

The passage of the fire retardant disc must meet certain requirements on the feature size in order to realize the fire retardant function. In addition, due to the different severity of the fire conditions, different upper limits or design thresholds of passage feature size are generally allocated to the fire retardant disc in practice, so that the fire retardant disc can have different fire retardant capabilities. The fire retardant capacity of the fire retardant disc is calibrated based on the fire retardant grade. It should be noted that ISO16852 Flame arresters-Performance requirements, test methods and limits for use provides upper limits on the passage feature size of the fire retardant disc at different fire retardant grades, as well as the corresponding typical flammable gases, as shown in Table 2.

TABLE 2

| ISO16852 Flame arresters-Performance requirements | | |
|---|---|---|
| Fire retardant grade | Upper limit on feature size | Typical gas |
| IIA1 | 1.14 | Methane + air |
| IIA | 0.94 | Propane + air |
| IIB1 | 0.75 | Ethylene + air |
| IIB2 | 0.65 | Ethylene + air |
| IIB3 | 0.65 | Ethylene + air |
| IIB | 0.5 | Hydrogen + air |
| IIC | 0.3 | Hydrogen + air |

The step of determining the plurality of intervals of the threshold range comprises calculating an upper limit value or a design threshold of the feature size of the passage in the fire retardant disc based on the fire retardant grade corresponding to the fire retardant disc to be detected, and based on which, determining a plurality of intervals of the threshold range for classifying and counting the key feature size data of each passage. According to Table 2, the upper limit value or the design threshold of the passage feature size is determined for the fire retardant disc to be detected in combination with the fire retardant grade thereof. The upper limit value or the design threshold of the feature size is taken as a target value for structural performance assessment of the fire retardant disc to be detected. A plurality of intervals of the threshold range is divided according to the target value for the structural performance assessment, and the distribution of the key feature size data obtained in step S120 is statistically calculated within each interval.

Specifically, the target value for structural performance assessment is set to H, and a plurality of intervals with sequentially increasing thresholds is determined based on the target value. In addition, multiple consecutive intervals are selected from the plurality of intervals of the threshold range as acceptable error intervals for judging the fire retardant performance subsequently. Preferably, multiple intervals of (0, 0.8H), (0.8H, 0.9H), (0.9H, 1.0H), (1.0H, 1.1H), (1.1H, 1.2H), (1.2H, +∞), etc. are divided. Among them, the intervals of (0.9H, 1.0H) and (1.0H, 1.1H) are taken as the acceptable error intervals in the embodiments of the present application, and the other intervals are taken as the unacceptable error intervals. It should be noted that the upper threshold value of the feature size corresponding to the passage in the fire retardant disc to be detected is determined based on the MESG value of the fire retardant grade in *ISO*16852 *Flame arresters—Performance requirements, test methods and limits for use*. Next, the effectiveness of the fire retardant performance of the fire retardant disc to be detected is determined based on the target value of the structural performance assessment of the fire retardant disc to be detected. When it is determined that the structural state of the fire retardant disc to be detected reaches the effective fire retardant level, the structural performance is continued to be analyzed based on the statistical results of the distribution of the corresponding key feature size. It should be noted that, according to the different required precision of the statistical results, the plurality of intervals of the threshold range can also be divided as (0, 0.95H), (0.95H, 1.05H), (1.05H, +∞) or the like. The specific dividing method is not limited in the present invention, and can be selected by one skilled in the art according to actual needs.

Further, when determining the structural uniformity state of the fire retardant disc to be detected, the effectiveness of the fire retardant performance of the fire retardant disc to be detected is judged based on the key feature size data for each passage of the fire retardant disc to be detected and the upper limit value or the design threshold of the feature size corresponding to the passage structure. When the structural state of the fire retardant disc to be detected reaches an effective fire retardant level, the distribution of the key feature size data of the fire retardant disc within the plurality of intervals of the threshold range is first statistically analyzed according to the key feature size data of each passage and the plurality of intervals divided, and the structural performance of the fire retardant disc is analyzed according to the statistical results. In the embodiments of the present application, two criteria need to be satisfied in terms of the size of the passage structure of the fire retardant disc to be detected. One is a veto item. That is, based on the key feature size data for each passage of the fire retardant disc to be detected, whether the structural state of the fire retardant disc to be detected reaches the effective fire retardant level is judged according to the upper limit value or the design threshold value of the feature size corresponding to the passage structure. Then, when the fire retardant disc to be detected reaches the effective fire retardant level, a judgment item is executed. That is, according to the key feature size data of each passage and the plurality of intervals divided, the distribution of the key feature sizes of the fire retardant disc is first statistically calculated, and the structural performance of the fire retardant disc is analyzed according to the statistical results.

Next, a specific method of judging the effective fire retardant performance of the fire retardant disc to be detected is described below in detail. In this method, it is necessary to compare the key feature size data of each passage of the fire retardant disc to be detected with the corresponding target value for the structural performance assessment of the fire retardant disc. If the key feature size data of each passage is less than the target value for the structural performance assessment, it is determined that the structural state of the fire retardant disc to be detected has reached the effective fire retardant level, otherwise the structural state of the fire retardant disc to be detected is at the ineffective fire retardant level (i.e., the structural state of the fire retardant disc to be detected has not reached the effective fire retardant level).

Further, when it is determined that the structural state of the fire retardant disc to be detected reaches the effective fire retardant level, the structural performance of the fire retardant disc is continued to be analyzed based on the statistical results of the distribution of the key feature size. Specifically, the number of key feature size data of each passage of the fire retardant disc to be detected falling within each interval of the threshold range is counted, in order to obtain the statistical results of the distribution of the key feature size data of each passage in the fire retardant disc to be detected, based on which the structural performance of the fire retardant disc to be detected is analyzed.

Further, a method of determining a structural uniformity state of the fire retardant disc to be detected (i.e., analyzing the structural performance of the fire retardant disc) is described in detail. An interval of the threshold range belonging to a first type of fire retardant error range is determined, and the structural error of the fire retardant disc to be detected is calculated based on the statistical results of the size distribution of each passage in the fire retardant disc to be detected. Then, the structural uniformity state of the fire retardant disc to be detected is determined based on the structural error through a preset acceptable error threshold. Specifically, the number of key feature size data obtained in step S120 falling within the intervals of (0, 0.8H), (0.8H, 0.9H), (0.9H, 1.0H), (1.0H, 1.1H), (1.1H, 1.2H), and (1.2H, +∞) in step S130 is counted, and the proportion of the key feature size data of each interval in the total number of data points is calculated. Then, the proportion of the intervals belonging to the first type of structural error range is selected, based on which the structural error of the fire retardant disc to be detected is calculated (i.e., the sum of the proportion of the intervals belonging to the first type of structural error range is determined as the structural error of the fire retardant disc to be detected). Then, the structural uniformity state of the fire retardant disc to be detected is determined based on the structural error and in combination with the predetermined acceptable error threshold. When the structural error falls within the range of the predetermined acceptable error threshold range, it is determined that the fire retardant disc to be detected has sound structural uniformity and reliable quality. Accordingly, an error analysis result characterizing the structural uniformity state of the fire retardant disc to be detected is output.

In the embodiments of the present invention, the first type of structural error range is used to characterize the reasonable size range corresponding to the qualified fire retardant disc to be detected. After statistically calculating the corresponding structural error based on the reasonableness of the actual manufactured size of each passage of the fire retardant disc, it is necessary to compare the structural error with the acceptable error threshold, wherein the acceptable error threshold indicates a threshold level that the structural error of the fire retardant disc to be detected is acceptable. If the structural error is below this threshold level, it is indicated that the actual size of each passage of the fire retardant disc can support the normal use of the fire retardant disc. If the structural error exceeds this threshold level, it is indicated that the actual size of each passage of the fire retardant disc cannot support the normal use of the fire retardant disc. For example, if the structural error of the fire retardant disc to be detected is acceptable within the error range of −10%-+10%, the key feature size data within the intervals of (0.9H, 1.0H) and (1.0H, 1.1H) are reasonable structural data, while the rest of the key feature size data are unreasonable structural data. The proportion of the unreasonable structural data in the total data points indicates the unreasonable structural error of the fire retardant disc to be detected. When the unreasonable structural error is less than 10%, the fire retardant disc to be detected is determined to have sound structural uniformity and reliable quality. It should be noted that the first type of structural error range is determined based on the actual required detection precision, which can be determined by one skilled in the art according to actual needs.

Finally, the structural error of the fire retardant disc to be detected is calculated using the distribution of the key feature size data obtained from said detection of the structural performance of the fire retardant disc to be detected in the predetermined intervals of the threshold range, thereby assessing the structural uniformity state of the fire retardant disc to be detected, and outputting the analysis result of the structural uniformity state that characterizes whether or not the current structural error belongs to the normal and acceptable level.

Furthermore, in order to guarantee continuous monitoring of the structural performance of new fire retardant disc and in-service fire retardant disc, the method for detecting the structural performance of the fire retardant disc described in the embodiments of the present invention is also configured to predict the remaining life span of the fire retardant disc. Specifically, an objective correlation function $F_0=F(t, f)$ is first constructed, with the effectiveness of the fire retardant performance $F_0$ of the fire retardant disc to be detected as the objective, and the cumulative use time t of the fire retardant disc and the structural error f of the fire retardant disc that dynamically changes along with the use time as the influencing factors, wherein the structural error of the fire retardant disc is obtained according to the statistics of the distribution of the feature size of the fire retardant disc.

Then, the remaining life span of the fire retardant disc is predicted based on the acceptable error threshold of the effectiveness reaching the limit fire retardant performance through said objective correlation function. In other words, the acceptable error threshold of the fire retardant disc is substituted in said objective correlation function to calculate the use time, and the corresponding remaining life span is further obtained according to the life span of the fire retardant disc.

In this manner, the present invention is able to construct a life span prediction function for the fire retardant disc through the distribution of key feature size of the fire retardant disc during different time of use, and then the function can be used to predict the life span of the fire retardant disc. For example, the passage size measurement and statistical analysis of a DN150 fire retardant disc are shown in the following Table 3.

TABLE 3

| Use time (day) | Proportion of unqualified passages (%) |
|---|---|
| 90 | 2.15 |
| 120 | 2.24 |
| 150 | 2.35 |
| 1,114 (predicted days) | 10 |

According to Table 3, when the threshold of the proportion of unqualified passages (acceptable error threshold) is 10%, it is predicted that the fire retardant disc will fail on Day 1,114. At this time, the influence of the use time of the fire retardant disc on the fire retardant performance thereof is $e^{0.0015t}/5.32$.

In addition, the method for detecting structural performance of the fire retardant disc according to the embodiments of the present invention further comprises determining the fire retardant quality of the fire retardant disc based on the structural uniformity state detection results thereof, in order to obtain more application scenario of the structural performance detection results. In actual application, a comprehensive analysis is performed to determine the actual fire retardant quality of the fire retardant disc to be detected based on the structural uniformity state thereof, the remaining life span thereof and other information.

Example 2

Figure 2:
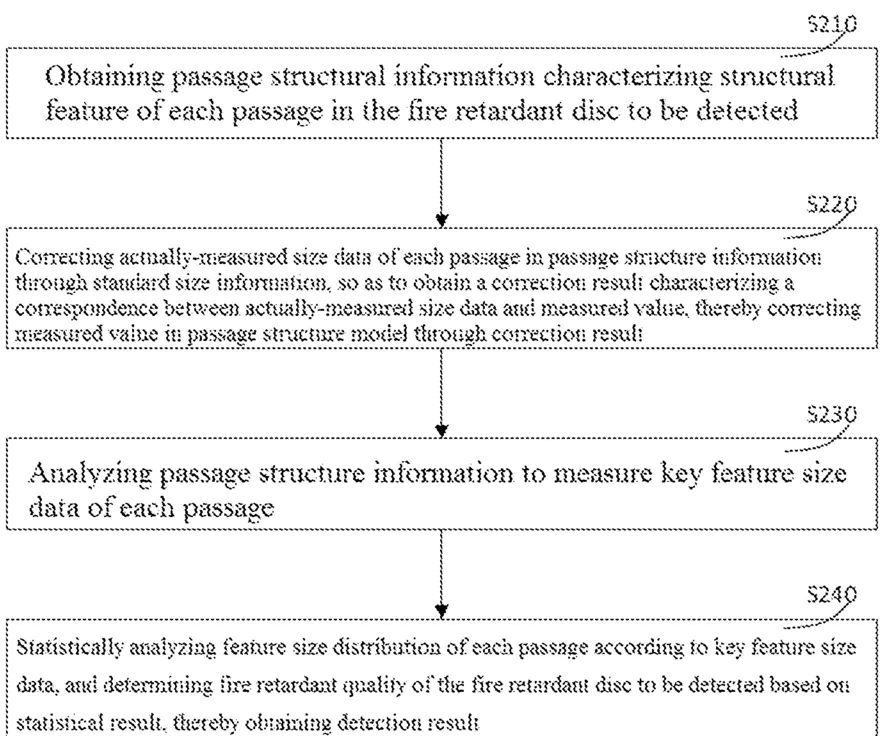
FIG. 2 shows steps in a second example of the method for detecting structural performance of fire retardant disc according to embodiments of the present application.

Based on the above Example 1, in order to ensure the accuracy of the assessment results of the fire retardant disc to be detected, the method for detecting structural performance of the fire retardant disc according to the embodiments of the present invention also comprises the following steps before analyzing the passage structural information. The actually-measured size data of each passage in the passage structural information is corrected through standard size information, in order to obtain a correction result characterizing a correspondence between the actually-measured size data and the measured values, and correct the measured values (e.g., measured value of key feature size) in the passage structural model through the correction result. FIG. 2 shows steps of Example 2 of the method for detecting structural performance of fire retardant disc according to embodiments of the present application. Example 2 of the method for detecting structural performance of fire retardant disc according to embodiments of the present invention will be described in detail as follows with reference to FIG. 2.

As shown in FIG. 2, passage structural information characterizing structural feature of each passage in the fire retardant disc to be detected is obtained in step S210. Then, in step S220 the actually-measured size data of each passage is corrected according to the passage structural information of the fire retardant disc obtained in step S210, wherein the actually-measured size data of each passage in the passage structural information is corrected through the standard size information, so as to obtain a correction result characterizing the correspondence between the actually-measured size data and the measured value, thereby measuring the key feature size data through the correction result. Then, the passage structural information is analyzed in step S230 to measure the key feature size data of each passage. Finally, in step S240 the feature size distribution of each passage is statistically analyzed through the predetermined intervals of the threshold range based on the measured value of the key feature size data obtained in step S230, and the structural uniformity state of the fire retardant disc to be detected is determined based on the statistical results.

It should be noted that in this example, step S210 is similar to step S110 above, step S230 is similar to step S120 above, and step S240 is similar to step S130 above. Therefore, step S210, step S230 and step S240 will not be described in detail in this example of the present invention.

In step S220, the calibration scale in the standard size information is determined through unit standard size data (e.g., unit distance, unit circle). Specifically, the actually-measured size data of each passage in the passage structural information is corrected through the unit standard size data based on the measured value of the structural feature size of each passage of the fire retardant disc to be detected. Based on the error due to the unit standard size data and the unit size data of the corresponding measured value in the passage structural information, the measured size of the passage of the fire retardant disc to be detected is corrected with compensation, thereby obtaining a correction result characterizing the correspondence between the measured size data and the measured value. On this basis, the key feature size is corrected with compensation. In the embodiments of the present invention, the measurement deviation of the feature size should be less than 0.005 mm.

It should be noted that in the embodiments of the present application, in addition to a single standard calibration for the correction of the actually-measured size data, a method of correcting the actually-measured size data with a plurality of standard calibrations may also be used to improve the precision of the correction results and reduce error during the measurement. The method for correcting the actually-measured size is not limited in the present application, and can be selected by one skilled in the art according to the required precision of the measured results.

Example 3

Figures 3, 4:
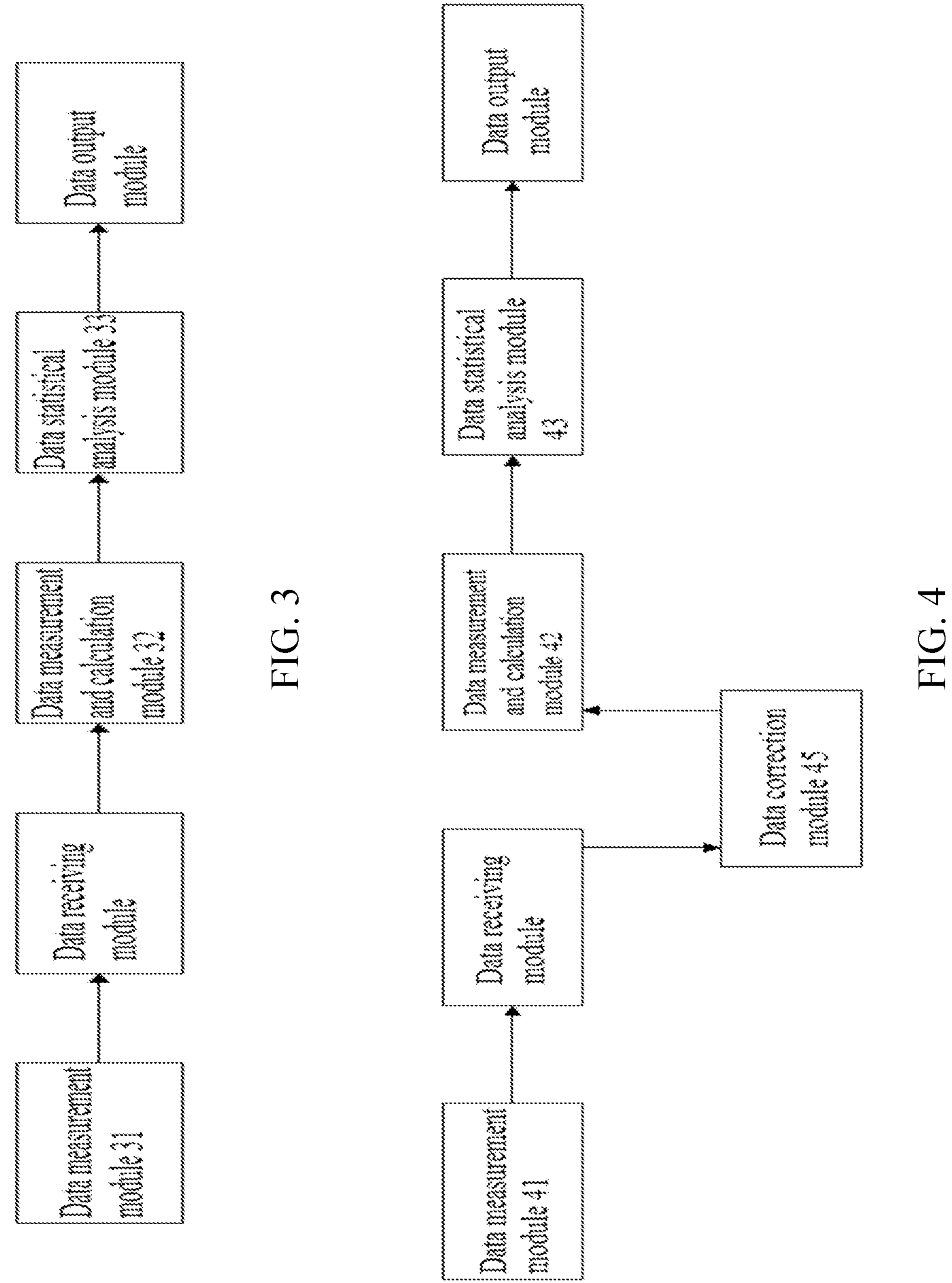
FIG. 3 is a block diagram of a first example of a system for detecting structural performance of fire retardant disc according to embodiments of the present application.
FIG. 4 is a block diagram of a first example of the system for detecting structural performance of fire retardant disc according to embodiments of the present application.

Based on the method for detecting structural performance of fire retardant disc described in the above Example 1, the embodiments of the present invention also provide a system for detecting structural performance of fire retardant disc (hereinafter referred to as "detection system"). FIG. 3 is a block diagram of a first example of a system for detecting structural performance of fire retardant disc according to embodiments of the present application.

As shown in FIG. 3, the detection system in the embodiments of the present invention comprises a data measurement module 31, a data measurement and calculation module 32, and a data statistical analysis module 33. Specifically, the data measurement module 31 is, according to the above step S110, configured to obtain the passage structural information characterizing the structural feature of each passage in the fire retardant disc to be detected. The data measurement and calculation module 32 is, according to the above step S120, configured to analyze the passage structural information obtained by the data measurement module 31, and measure the key feature size of each passage. The data statistical analysis module 33 is, according to the above step S130, configured to statistically analyze the distribution of feature size of each passage based on the key feature size data measured by the data measurement and calculation module 32, and determine the state of structural uniformity of the fire retardant disc to be detected based on the statistical results.

In addition, the detection system described in Example 3 of the present invention further comprises a data receiving module (not shown) and a data output module (not shown). The data receiving module is configured to receive passage structure information characterizing the structural feature of each passage in the fire retardant disc to be detected obtained by the data measurement module 31. The data output module is configured to output the statistical analysis results obtained by the data statistical analysis module 33 on the distribution of the feature size of each passage, and output the corresponding detection results.

Example 4

Based on the method for detecting structural performance of fire retardant disc described in the above Example 2, the embodiments of the present invention also provide a system for detecting structural performance of fire retardant disc (hereinafter referred to as "detection system"). FIG. 4 is a block diagram of a second example of a system for detecting structural performance of fire retardant disc according to embodiments of the present application.

As shown in FIG. 4, the detection system in the embodiments of the present invention comprises a data measurement module 41, a data measurement and calculation module 42, a data statistical analysis module 43, and a data correction module 44. Specifically, the data measurement module 41 is, according to the above step S210, configured to obtain the passage structural information characterizing the structural feature of each passage in the fire retardant disc to be detected. The data measurement and calculation module 42 is, according to the above step S230, configured to analyze the passage structural information obtained by the data measurement module 41, and measure the key feature size of each passage. The data correction module 44 is, according to the above step S220, configured to correct the actually-measured size data of each passage in the passage structure information through the standardized size information, so as to obtain the corrected result characterizing the correlation between the actually-measured size data and the measured value, and correct the measured value in the passage structure model through the corrected result, thereby measuring the key feature size data based on the corrected result. The data statistical analysis module 43 is, according to the above step S240, configured to statistically analyze the feature size distribution of each passage based on the key feature size data measured by the data measurement and calculation module 42, and determine the state of structural uniformity of the fire retardant disc to be detected based on the statistical results.

In addition, the detection system described in Example 4 of the present invention further comprises a data receiving module (not shown) and a data output module (not shown). The data receiving module is configured to receive the passage structure information characterizing the structural features of each passage in the fire retardant disc to be detected obtained by the data measurement module 31. The data output module is configured to output the statistical analysis results obtained by the data statistical analysis module 44 on the distribution of the feature size of each passage, and output the corresponding detection results.

In actual application, the fire retardant disc can be classified as corrugated-plate fire retardant disc, parallel-plate fire retardant disc and fire retardant disc with other structures (e.g., micro-circular passage fire retardant disc) according to the passage structure. The fire retardant disc can also be classified as unused new fire retardant disc and used in-service fire retardant disc according to the use condition. The various fire retardant discs to be detected according to the present invention will be further illustrated as follows with reference to the following specific examples of the present invention.

Example 5

In one specific embodiment of the present invention, the fire retardant disc to be detected is a newly-produced corrugated-plate fire retardant disc, with the MESG value of IIA, the designed feature size of the passage of 0.8 mm, and the designed diameter of 300 mm.

As the fire retardant disc to be detected is a corrugated-plate fire retardant disc, the winding process results in a triangular-like passage structure thereof. (Each passage of the fire retardant disc to be detected has a structure with three corners connected in a curved manner and the bottom edge thereof being configured as a straight line-like curve.) A triangular passage structure model of the fire retardant disc to be detected is constructed through the measured value of feature size of the passage in the fire retardant disc to be detected obtained after correction.

According to a design value of 0.8 mm for the feature size of passage of the fire retardant disc to be detected, the total number of passages of the fire retardant disc to be detected is obtained to be about 84,375, using a method for estimating the number of passages in the fire retardant disc as described in Example 1 of the present application, so that the number of detecting points selected therefrom is 9-84. Next, 42 passage samples characterizing the structural feature of each passage in the fire retardant disc to be detected are preferably selected from the 9-84 detecting points, and corresponding pixel pitch data are extracted, based on which the measured values of the feature size of the 42 passage samples are determined. Since the passage structure of the corrugated-plate fire retardant disc approximates a triangle, it is determined that the passage structure of the fire retardant disc to be detected is a triangle. A passage structure model of the fire retardant disc to be detected is constructed through the measured values of the feature size of the selected 42 passage samples in combination with the triangular passage structure of the fire retardant disc to be detected, and the measured values of the structural feature size of each passage are indicated in the passage structure model.

Next, the actually-measured size data of the 42 passages are corrected through the standard size data of 1 mm. In this example, the actually-measured size data are 0.95 mm and 0.96 mm, so that the measured value of the key feature size data of the fire retardant disc to be detected after compensation and calibration is recorded as the actually-measured size data plus 0.045 mm.

The passage structure model obtained after size correction is taken as the research object, and the height of the triangle is taken as the key feature size data of the fire retardant disc to be detected, which are recorded as H1, H2, H3, . . . , H42. The upper limit value of the feature size of the passage in the fire retardant disc to be detected is 0.94 mm, obtained by the method described in Example 1. The upper limit value of the feature size is compared with 42 corrected key feature size data respectively. Result shows that the 42 corrected key feature sizes are all less than 0.94 mm. At this time, it is determined that the fire retardant disc to be detected is effective. Then, the design value 0.8 mm of the passage structure is taken as the target value H for the structural performance assessment of the fire retardant disc to be detected, so that the statistical results of the distribution of 42 corrected key feature size data are obtained, which are shown in Table 4.

TABLE 4

Statistical results of the distribution of key feature size data in the fire retardant disc to be detected in Example 5

| Interval | Number | Proportion (%) |
|---|---|---|
| (0, 0.64) | 1 | 2.4 |
| (0.64, 0.72) | 3 | 7.1 |
| (0.72, 0.8) | 26 | 61.9 |
| (0.8, 0.88) | 12 | 28.6 |
| (0.88, 0.94) | 0 | 0 |

In the example of the present application, the two intervals (0.72, 0.8) and (0.8, 0.88) are reasonable structure (manufacturing) error intervals, while the three intervals (0, 0.64), (0.64, 0.72), and (0.88, 0.94) are unreasonable structure (manufacturing) error intervals. After calculation, the key feature size data within the three unreasonable structural (manufacturing) error intervals account for 9.5% (i.e., 2.4%+7.1%+0%) of the total data, which belongs to the acceptable error range (−10%-+10%). At this time, it is determined that the fire retardant disc to be detected has sound structural uniformity and reliable quality. The analysis result of the structural uniformity state of the fire retardant disc to be detected is then output, i.e., for the newly-produced corrugated-plate fire retardant disc with the MESG value of IIA, the design value of the feature size of the passage of 0.8 mm, and the design value of the diameter of 300 mm, the structural (manufacturing) error thereof is 9.5%, which belongs to the acceptable error range (−10%-+10%).

Example 6

In one specific embodiment of the present invention, the fire retardant disc to be detected is a newly-produced corrugated-plate fire retardant disc with the MESG value of IIA, the design value of passage feature size of 0.8 mm, and the design value of diameter of 300 mm.

In the example of the present application, the passage structure information characterizing the structural feature of each passage in the fire retardant disc to be detected is obtained through the overall linear scanning technology. It should be noted that since there is a difference between solid and hollow structural features of the passage in the fire retardant disc, the information on distinguishable solid and hollow portions of the passage structure is obtained through laser scanning, and the solid sides and hollow regions of the passage in the fire retardant disc to be detected are determined, so as to obtain the passage structure information. In addition, the passage structure information is obtained, preferably, by fixing the fire retardant disc to be detected and moving the laser scanner in a plane, in order to ensure that all the passage information of the fire retardant disc to be detected is scanned and obtained in the procedure of obtaining the passage structure. The number of passages of the fire retardant disc to be detected acquired through this method is 81,206.

The laser scanner completes a full scan of the passage structure of the fire retardant disc to be detected according to a predetermined trajectory, and constructs a projection of the corresponding fire retardant disc. According to the pixel positions, a passage model curve of the fire retardant disc is constructed based on the corrected measured value of the feature size of the passage in the fire retardant disc to be detected, defining the value of the feature size of the passage as the maximum spacing between two curves. Preferably, when the passage model of the fire retardant disc to be detected is constructed as a cubic spline curve, the upper curve f (x), the lower curve g (x) and the spacing between two curves h (x)=f (x)−g (x) are defined respectively. Based on the cubic spline curve, the maximum h(x) value located in the interval (a, b) is obtained, which is taken as the key feature size data of the passage of the fire retardant disc to be detected, wherein the interval (a, b) is the range of independent variable values of the feature size of the passage in the fire retardant disc to be detected.

Next, the procedure of correcting the actually-measured size data of the passage in the passage structure information in the example of the present application is described in detail. Preferably, the measured size data of the passage of the fire retardant disc to be detected is corrected using 1 mm standard circle. Specifically, five 1 mm standard circles associated with the fire retardant disc to be detected are determined based on the measured value. By calculating the differences between the five 1 mm standard circles obtained based on the measured value and an ideal 1 mm standard circle, the measuring error is obtained and the average measuring error is further calculated as −0.37 μm. Then, the compensation and calibration is carried out for the measured value of the key feature size data of the fire retardant disc to be detected, so that the measured value after compensation and calibration is recorded as the actually-measured size plus 0.0037 mm.

The upper limit value of the feature size of the passage in the fire retardant disc to be detected is obtained according to the method described in Example 1 as 0.94 mm, which is compared with the key feature size data after compensation and calibration, respectively. In the example of the present application, all the key feature size data are less than 0.94 mm, and it is then determined that the fire retardant disc to be detected is effective. The design value of the feature size of the passage, 0.8 mm, is taken as the target value H of the structural performance assessment of the fire retardant disc to be detected, thereby obtaining the statistical result of the distribution of the key feature size data of the fire retardant disc to be detected, which is shown in Table 5.

TABLE 5

Statistical result of distribution of key feature size data of the fire retardant disc to be detected in Example 6

| Interval | Number | Proportion (%) |
|---|---|---|
| (0, 0.64) | 856 | 1.05 |
| (0.64, 0.72) | 6,095 | 7.51 |
| (0.72, 0.8) | 52,136 | 64.2 |
| (0.8, 0.88) | 22,087 | 27.2 |
| (0.88, 0.94) | 32 | 0.04 |

In the above statistical result, the two intervals (0.72, 0.8) and (0.8, 0.88) are reasonable structure (manufacturing) error intervals, and the three intervals (0, 0.64), (0.64, 0.72), and (0.88, 0.94) are unreasonable structure (manufacturing) error intervals. After calculation, the key feature size data within the three unreasonable structural (manufacturing) error intervals account for 8.6% (i.e., 1.05%+7.51%+0.04%) of the total data, which belongs to the acceptable error range (−10%-+10%). At this time, it is determined that the fire retardant disc to be detected has sound structural uniformity and reliable quality. The analysis result of the structural uniformity state of the fire retardant disc to be detected is then output, i.e., for the newly-produced corrugated-plate fire retardant disc with the MESG value of IIA, the design value of the feature size of the passage of 0.8 mm, and the design value of the diameter of 300 mm, the structural (manufacturing) error thereof is 8.6%, which belongs to the acceptable error range (−10%-+10%).

Example 7

In one specific embodiment of the present invention, the fire retardant disc to be detected is a newly-produced corrugated-plate fire retardant disc with the MESG value of IIA, the design value of passage feature size of 0.8 mm, and the design value of diameter of 300 mm.

In this example of the present application, the passage structure information characterizing the structural features of each passage in the fire retardant disc to be detected is obtained through the partial image shooting and stitching technology or the overall image shooting technology. It should be noted that when the fire retardant disc to be detected has a relatively small diameter, the overall image shooting technology is adopted, wherein the fire retardant disc to be detected is placed on a horizontal plane, and a high-definition camera is provided at a fixed position above it to take photographs, so as to obtain the corresponding passage structure information. When the fire retardant disc to be detected has a relatively large diameter, the partial image shooting and stitching technology is adopted due to the visual deviation in the camera shooting, wherein the entire surface of the fire retardant disc to be detected is divided into a plurality of portions, the photograph of each portion is taken and then stitched together, in order to obtain the passage structure information of the entire fire retardant disc to be detected. The photo stitching technology is known in the prior arts, and thus will not be illustrated here in detail. Alternatively, the partial image shooting and stitching technology for obtaining surface information of the passage in the fire retardant disc by randomly shooting photographs of the entire surface of the fire retardant disc to be detected can also be adopted. In this example, the method of obtaining the original to-be-stitched photographs of the fire retardant disc to be detected and the number of photographs are not limited, and can be selected by one skilled in the art according to actual needs.

Preferably, a high-definition camera with a fixed focal length is used to take 16 sets of partial photographs of the fire retardant disc to be detected, which are then stitched to obtain the overall passage structure information of the fire retardant disc to be detected. In the example of the present application, the number of passages in the fire retardant disc to be detected is 82,415. Next, based on the overall passage structure information of the fire retardant disc to be detected, a corresponding triangular passage structure model is constructed according to the measured feature size data correcting method and the model constructing method for the passage in the fire retardant disc as described in Example 5, using the corrected measured value of feature size of the passage in the fire retardant disc to be detected. Taking the passage structure model as a research object, the height of each triangle is then used as the key feature size data of the fire retardant disc to be detected.

In this example, the actually-measured size of the passage is 1.023 mm, so that the measured value of the key feature size data of the fire retardant disc to be detected after compensation and calibration is recorded as the actually-measured size minus 0.023 mm.

According to the method described in Example 1, the upper limit value of the feature size of the passage in the fire retardant disc to be detected is 0.94 mm, which is compared with the corrected key feature size data respectively, so as to obtain the analysis result of all the key feature sizes less than 0.94 mm. At this time, it is determined that the fire retardant disc to be detected is effective. The design value 0.8 mm of the feature size of the passage is taken as the target value H for the structural performance assessment of the fire retardant disc to be detected, so as to obtain the statistical result of the distribution of the key feature size data of the fire retardant disc to be detected, which is shown in Table 6.

TABLE 6

Statistical result of distribution of key feature size data of the fire retardant disc to be detected in Example 7

| Interval | Number | Proportion (%) |
|---|---|---|
| (0, 0.64) | 923 | 1.14 |
| (0.64, 0.72) | 6,524 | 8.03 |
| (0.72, 0.8) | 52,346 | 64.46 |
| (0.8, 0.88) | 22,566 | 27.79 |
| (0.88, 0.94) | 56 | 0.07 |

In the above statistical result, the two intervals (0.72, 0.8) and (0.8, 0.88) are reasonable structure (manufacturing) error intervals, and the three intervals (0, 0.64), (0.64, 0.72), and (0.88, 0.94) are unreasonable structure (manufacturing) error intervals. After calculation, the key feature size data within the three unreasonable structural (manufacturing) error intervals account for 9.24% (i.e., 1.14%+8.03%+0.07%) of the total data, which belongs to the acceptable error range (−10%-+10%). At this time, it is determined that the fire retardant disc to be detected has sound structural uniformity and reliable quality. The analysis result of the structural uniformity state of the fire retardant disc to be detected is then output, i.e., for the newly-produced corrugated-plate fire retardant disc with the MESG value of IIA, the design value of the feature size of the passage of 0.8 mm, and the design value of the diameter of 300 mm, the structural (manufacturing) error thereof is 9.24%, which belongs to the acceptable error range (−10%-+10%).

Example 8

In one specific embodiment of the present invention, the fire retardant disc to be detected is an in-service corrugated-plate fire retardant disc with the MESG value of IIB3, unknown design value of passage feature size and the design value of diameter of 150 mm.

The passage structure information of the fire retardant disc to be detected is obtained according to the method described in Example 6, thereby obtaining the number of passages of the fire retardant disc to be detected as 42,178. Next, the passage structure model curve of the fire retardant disc to be detected is constructed according to the method described in Example 6, thereby obtaining the corresponding key feature size data. Finally, the actually-measured feature size data in the passage structure information of the fire retardant disc to be detected are corrected according to the method described in Example 5. In this example, the actually-measured feature size is 0.995 mm, so that the measured value of the fire retardant disc to be detected after compensation and calibration is recorded as the actually-measured size data plus 0.005 mm.

According to the method described in Example 1, the upper limit value of the feature size of the passage of the fire retardant disc to be detected is 0.65 mm, which is compared with the key feature size data respectively, obtaining the analysis result of all key feature sizes in this example less than 0.65 mm. At this time, the fire retardant disc to be detected is determined to be effective. Since the design value of the passage feature size of the fire retardant disc to be detected is unknown, in this example of the present application the distribution of the key feature size data is statistically analyzed in four intervals of (0, 0.7H0), (0.7H0, 0.8H0), (0.8H0, 0.9H0) and (0.9H0, H0), which is shown in Table 7.

TABLE 7

Statistical result of distribution of key feature size data of the fire retardant disc to be detected in Example 8

| Interval | Number | Proportion (%) |
|---|---|---|
| (0, 0.7H0) | 1,236 | 2.93 |
| (0.7H0, 0.8H0) | 27,658 | 65.57 |
| (0.8H0, 0.9H0) | 12,496 | 29.63 |
| (0.9H0, H0) | 788 | 1.87 |

In the above statistical result, the key feature size data are mostly presented in the two intervals of (0.7H0, 0.8H0) and (0.8H0, 0.9H0), accounting for 95.2% (i.e., 65.57%+29.63%) of all the key feature size data, so that the structure of the fire retardant disc to be detected (the used size) has an error of 4.8% (i.e., 2.93%+1.87%), which is within the acceptable error range (−10%-+10%). At the same time, it can be deduced that the design value of the passage feature size of the fire retardant disc to be detected is within the range of 0.8H0±0.1H0. At this time, it is determined that the fire retardant disc to be detected has sound structural uniformity and reliable quality. Then, the analysis result of the structural uniformity state of the fire retardant disc to be detected is output, i.e., for the in-service corrugated-plate fire retardant disc with the MESG value of IIB3, unknown design value of the passage feature size, and design value of the diameter of 150 mm, the structural (the used size) error thereof is 4.8%, which falls within the acceptable error range (−10%-+10%).

Example 9

In one specific embodiment of the present invention, the fire retardant disc to be detected is a newly-produced parallel-plate fire retardant disc, with the MESG value of IIA, the design value of the feature size of spacing between parallel plates of 1.2 mm, and the manufacturing precision of ±5%.

The passage structure information of the fire retardant disc to be detected is obtained according to the method described in Example 6, thereby obtaining the number of passages of the fire retardant disc to be detected as 135. Next, the passage structure model curve of the fire retardant disc to be detected is constructed according to the method described in Example 6, thereby obtaining the corresponding key feature size data. Finally, the measured feature size data in the passage structure information of the fire retardant disc to be detected are corrected according to the method described in Example 5. In this example of the present application, the measured feature size is 1.0042 mm, so that the measured value of the key feature size data of the fire retardant disc to be detected after compensation and calibration is recorded as the measured feature size—minus 0.0042 mm.

According to the method described in Example 1, the upper limit value of the feature size of the passage in the fire retardant disc to be detected is 0.65 mm. By comparing the design value of the feature size as the target value of the structural performance assessment of the fire retardant disc to be detected with the above upper limit value of the feature size, it can be seen that in this example of the present application, the design value of the feature size of the fire retardant disc to be detected is greater than the corresponding upper limit value of the feature size, and thus the fire retardant disc to be detected cannot be assessed according to the design value of the feature size. Therefore, in this example of the present application controlling the manufacturing precision of the fire retardant disc to be detected is mainly assessed. Taking the design value H of the fire retardant disc to be detected, 1.2 mm, as an intermediate value, the key feature size data are statistically analyzed in three intervals of (0, 0.95H), (0.95H, 1.05H) and (1.05H, +∞) based on the precision data, which are shown in Table 8.

TABLE 8

Statistical result of distribution of key feature size data of the fire retardant disc to be detected in Example 9

| Interval | Number | Proportion (%) |
|---|---|---|
| (0, 1.14) | 7 | 5.19% |
| (1.14, 1.26) | 128 | 94.81% |
| (1.26, +∞) | 0 | 0 |

In the above statistical result, (0.95H, 1.05H) is an acceptable interval, while (0, 0.95H) and (1.05H, +∞) are unacceptable intervals. In the acceptable interval (1.14, 1.26), the key feature size data account for 94.81% of the total data, and there is no key feature size exceeding 1.05H in this example of the present application. At this time, it is determined that the fire retardant disc to be detected has sound structural uniformity and reliable quality. Then, the analysis result of the structural uniformity state of the fire retardant disc to be detected is output, i.e., for the newly-produced parallel-plate fire retardant disc with the MESG value of IIA, the design value of passage feature size of 1.2 mm, and the manufacturing precision of ±5%, the structural (manufacturing) error is 5.19%, which falls within the acceptable error range (−10%-+10%).

The present invention proposes a method and system for detecting structural performance of fire retardant disc based on machine vision technology, which can automatically obtain the passage structure information of fire retardant disc in different conditions of use, and construct the corresponding equivalent mathematical model for the structure of the fire retardant disc. Accordingly, the present invention solves the problem of imprecision and ineffectiveness in detecting and assessing the structural performance of the fire retardant disc, and facilitates the effective assessment of the fire retardant and circulation performance of the fire retardant disc. At the same time, the method and system according to the present invention, through non-destructive structural detection and assessment of the fire retardant disc, also facilitate the assessment of the fire retardant performance and life span of the in-service fire retardant disc.

The foregoing is merely illustrative of specific embodiments of the present invention, but the scope of protection of the present invention is not limited thereto. Any modifications or substitutions that can be readily conceived by one skilled in the art within the technical scope disclosed herein shall fall within the scope of protection of the present invention.

Of course, the present invention may have various other embodiments. Without departing from the spirit of the present invention and the essence thereof, one skilled in the art can make various modifications and deformations according to the present invention, which, however, shall fall within the scope of protection of the claims of the present invention.

It should be understood by one skilled in the art that the above modules or steps of the present invention can be realized by common computing devices installed on a single computing device, or distributed on a network comprising a plurality of computing devices. Optionally, the above modules or steps can be realized by program codes executable by computing devices, whereby they can be stored in a storage device and executed by computing devices, or they can be made separately into integrated circuit modules or a single integrated circuit module. In this manner, the present invention is not limited to any particular combination of hardware and software.

Although the embodiments of the present invention are described hereinabove, the disclosure is provided for facilitating to understand the implementing mode of the present invention, but rather restricting the present invention. Without departing from the spirit and scope of the present disclosure, one skilled in the art can make various modifications and improvements in forms and details of the implementing mode. The scope of protection of the present invention shall be determined by the appending claims.

The invention claimed is:

1. A method for detecting structural performance of a fire retardant disc, wherein the fire retardant disc comprises a plurality of passages, the method comprising the steps of:

S1: obtaining passage structural information characterizing a structural feature of each passage in the fire retardant disc;

S2: analyzing the passage structural information and measuring a key feature size of each passage;

S3: statistically analyzing feature size distribution of each passage according to the key feature size, and determining a structural uniformity state of the fire retardant disc based on a statistical result of the statistical analysis of feature size distributions of the plurality of the passages;

S4: constructing an objective correlation function with an effectiveness of fire retardant performance of the fire retardant disc as an objective, and a cumulative use time of the fire retardant disc and a structural error corresponding to the statistical result of the feature size distribution of the plurality of passages in the fire retardant disc as influencing factors; and S5: predicting a remaining life span of the fire retardant disc based on an acceptable error threshold of effectiveness reaching a limiting fire retardant performance through the objective correlation function.

2. The method according to claim 1, wherein S1 comprises obtaining the passage structural information through one selected from the group consisting of:

multi-point random sampling technology;

overall linear scanning technology;

overall image shooting technology; and partial image shooting and stitching technology.

3. The method according to claim 2, wherein S1 comprises:

estimating a total number of the plurality of passages in the fire retardant disc, and determining a number of detecting points to be selected;

dividing the fire retardant disc into a plurality of portions based on the number of detecting points and distribution of each passage, and randomly selecting a detecting point in each portion to obtain a first set of passage samples comprising each detecting point; and obtaining the passage structural information according to a structural feature of each detecting point in the first set of passage samples.

4. The method according to claim 1, wherein S2 comprises:

constructing a passage structure model for reproducing a passage structure based on pixel pitch in the passage structure information in combination with a geometric feature of the passage structure; and identifying the key feature size of each passage in the passage structure model.

5. The method according to claim 4, wherein:

when the passage structure of the fire retardant disc is triangular, a triangular passage structure model is constructed, and a height of a triangular passage is determined as the key feature size of each passage;

when the passage structure of the fire retardant disc is trapezoidal, a trapezoidal passage structure model is constructed, and a height of a trapezoidal passage is determined as the key feature size of each passage; and when the passage structure of the fire retardant disc is rhombic, a rhombic passage structure model is constructed, and a short diagonal line of a rhombic passage is determined as the key feature size of each passage.

6. The method according to claim 1, further comprising:

correcting actually-measured size data of each passage in the passage structure information through standard size information to obtain a correction result characterizing a relation between the actually-measured size data and a measured value; and correcting the measured value in the passage structure model through the correction result.

7. The method according to claim 1, further comprising:

calculating an upper limit value or a design threshold of a feature size corresponding to the passage structure based on a fire retardant grade corresponding to the fire retardant disc; and determining a plurality of intervals of a threshold range for classifying and counting the key feature size data of each passage.

8. The method according to claim 7, wherein S3 further comprises:

determining the effectiveness of fire retardant performance of the fire retardant disc based on the key feature size data for each passage of the fire retardant disc and the upper limit value or the design threshold of the feature size corresponding to the passage structure;

statistically analyzing distribution of the key feature size of the fire retardant disc according to the key feature size data of each passage and the plurality of intervals of the threshold range;

and then analyzing the structural performance of the fire retardant disc according to statistical result, with the proviso that the fire retardant performance of the fire retardant disc is effective.

9. The method according to claim 8, wherein:

the key feature size data of each passage in the fire retardant disc is compared with the upper limit value or the design threshold of the feature size, respectively, and when the key feature size data of each passage is smaller than the upper limit value or the design threshold of the feature size, it is determined that a structural state of the fire retardant disc reaches an effective fire retardant level; otherwise, the structural state of the fire retardant disc is in an ineffective fire retardant level.

10. The method according to claim 8, wherein:

an interval of the threshold range belonging to a first type of structural error range is determined, and a structural error of the fire retardant disc is calculated according to the statistical result of the feature size distribution of each passage; and the structural uniformity state of the fire retardant disc is determined based on the structural error through a predetermined acceptable error threshold.

11. The method according to claim 1, wherein the fire retardant disc was in service or is a new fire retardant disc, wherein when the fire retardant disc was in service, the method further comprises cleaning the fire retardant disc to remove impurities on a surface thereof.

12. The method according to claim 1, further comprising:

determining fire retardant quality of the fire retardant disc according to the structural uniformity state thereof.

13. A system for detecting structural performance of a fire retardant disc, comprising:

a data measurement module, configured to obtain passage structural information characterizing a structural feature of each passage in the fire retardant disc;

a data measurement and calculation module, configured to analyze the passage structural information, and measure a key feature size data of each passage; and a data statistical analysis module, configured to statistically analyze feature size distribution of each passage based on the key feature size data, and to determine a structural uniformity state of the fire retardant disc based on statistical results.

* * * * *